Nov. 13, 1962     R. B. DOWDELL     3,063,295
MASS FLOW METER

Filed July 8, 1958     4 Sheets-Sheet 1

RODGER B. DOWDELL
INVENTOR.

BY *E C Sanborn*

ATTORNEY

Nov. 13, 1962 R. B. DOWDELL 3,063,295
MASS FLOW METER
Filed July 8, 1958 4 Sheets-Sheet 2

RODGER B. DOWDELL
INVENTOR.

BY E C Sanborn

ATTORNEY

Nov. 13, 1962  R. B. DOWDELL  3,063,295
MASS FLOW METER

Filed July 8, 1958  4 Sheets-Sheet 3

INVENTOR.
RODGER B. DOWDELL
BY *E.C. Sanborn*
ATTORNEY

INVENTOR.
RODGER B. DOWDELL
BY
ATTORNEY

United States Patent Office

3,063,295
Patented Nov. 13, 1962

3,063,295
MASS FLOW METER
Rodger B. Dowdell, Cumberland, R.I., assignor, by mesne assignments, to The New York Air Brake Company, New York, N.Y., a corporation of New Jersey
Filed July 8, 1958, Ser. No. 747,309
15 Claims. (Cl. 73—194)

This invention relates to flow meters and more particularly to a mass flow meter for measuring the mass flow rate of material flowing through a conduit independently of variations in volume.

The present application is a continuation-in-part of my now abandoned prior application Ser. No. 523,571, filed July 21, 1955, and assigned to the assignee of the present application Mass flow meters have heretofore been provided which, in addition to having a relatively complex structure, have required an external energy source to impart desired velocity components to material to be measured, such as Coriolis acceleration or gyroscopic reaction. In accordance with one important feature of the present invention, a highly accurate mass flow meter may be provided which does not require, and which operates independently of, any external energy source apart from the energy represented by the flow of material through the conduit, the mass flow rate of which is to be determined.

It is, therefore, a principal object of the present invention to provide an accurate yet highly simplified mass flow meter which converts some of the energy of the material to be measured, represented by its momentum while flowing through a conduit, into angular momentum about an axis thereby rendering the device independent of and avoiding the necessity for providing an external power supply for that purpose.

Another object is to provide such a mass flow meter in which some of the energy of the material to be measured, represented by its axial momentum is converted into angular momentum about the axis of the passageway through which the material is flowing thereby rendering the device independent of and avoiding the necessity for providing an external power supply for that purpose and through which the flow of the material to be measured is essentially straight through.

Yet another object is to provide a mass flow meter which is highly accurate in performance yet of highly simplified construction which readily lends itself to mass production manufacturing techniques.

Important advantages of the present invention are achieved by providing a mass flow meter for measuring the mass flow rate of material flowing along a conduit which includes an adjustable structure for converting a variable portion of the fluid energy of the material represented by the velocity of its stream into angular velocity about the stream. The induced angular velocity of the material and also its angular momentum are sensed.

In accordance with one embodiment of the invention the angular momentum of the flow in the stream is maintained constant by suitably adjusting said adjustable structure and thereby varying the angular velocity imparted to the particles of the stream. The variations in angular velocity which are sensed are inversely proportional to the mass rate of flow and are utilized to provide the desired measurement thereof.

In accordance with another embodiment of the present invention the angular velocity of the particles of the flow is maintained constant by suitably adjusting said adjustable structure and variations in the angular momentum of the particles in the flow are directly proportional to variations in the mass flow rate. The angular momentum is sensed thereby providing the desired measure of the mass rate of flow.

The normal velocity of a stream of material flowing in a path or flow circuit is disturbed to the extent that a portion of the fluid energy is converted into angular momentum. In accordance with a preferred embodiment of the present invention, the particles in the stream are given an angular velocity component about a common axis. Due to the angular momentum imparted to the material, it serves to rotate an assembly of rotatable vanes mounted for rotation about said common axis. A set of straightening vanes is provided downstream from the assembly of rotatable vanes and has sufficient extent in the direction of said common axis that the material, in flowing therethrough, may have all of the angular momentum extracted therefrom.

It may be readily shown, in keeping with well known principles, that the mass rate of flow of the particles in a stream having angular momentum is directly proportional to their angular momentum provided the angular velocity remains constant. It may also be readily shown that the mass rate of flow is inversely proportional to the angular velocity of the particles provided the angular momentum remains constant.

In one embodiment of the present invention means are provided for maintaining the speed of rotation of the assembly of rotatable vanes constant and thereby the angular velocity of the material is maintained constant. Measurement of the torque exerted by the straightening vanes in removing the angular momentum of the particles provides, on a suitably graduated scale, a measurement of the mass rate of flow.

In another and preferred embodiment, the induced angular momentum of the particles in the stream is sensed and means are provided for maintaining the same constant. With the angular momentum kept constant, variations in the angular velocity of the material flowing in the stream as represented by variations in the rate of rotation of the assembly of rotatable vanes is inversely proportional to the mass rate of flow. Thus, means are provided for sensing this angular velocity and displaying on a suitably marked scale the desired mass rate of flow.

Further objects, as well as advantages of this invention, will be apparent from the following description and the accompanying drawings in which FIGURE 1 is a horizontal sectional view, partially diagrammatic, of a mass flow meter embodying the present invention;

Figure 1:
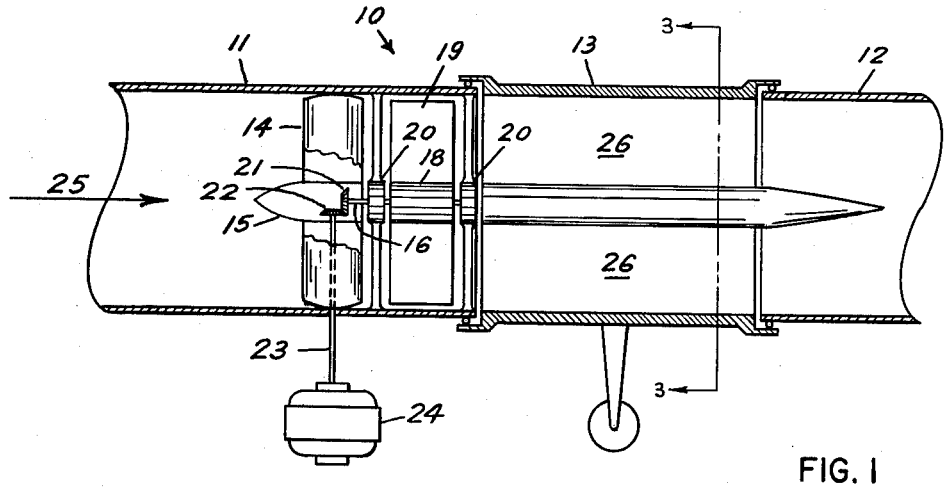
Figure 2:
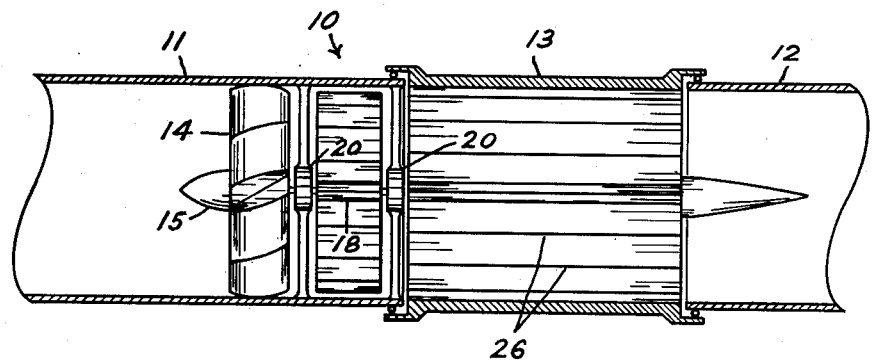
FIGURE 2 is a top plan view thereof partly in section.

Referring now to the drawings, the mass flow meter 10 comprises an inlet tube 11 and an outlet tube 12 spaced by an intermediate tubular section 13, all having substantially equal inner diameters. In the present instance tubular section 13 is rotatably connected to the juxtaposed end portions of tubes 11 and 12; suitable rotating seals being provided to prevent leakage. In advance of, and upstream relative to intermediate tubular section 13, there is mounted in inlet tube 11 an array of inlet guide vanes 14 radially disposed about a central hub 15 fixed in coaxial relation with the inlet tube. Vanes 14 are elongated, substantially planar members disposed with their longitudinal axes extending radially outward from hub 15 toward tube 11. In order to impart a tangential velocity to the material flowing through inlet tube 11 relative to the axis of the tube, guide vanes 14 are each inclined so that they extend in planes forming a suitable angle with the axis of the inlet tube.

Spaced downstream from hub 15 and fixed on shaft 16 is a second hub 18 from which vanes 19 extend radially outward toward tube 11. Shaft 16 is rotatably mounted along the axis of tube 11 by means of bearings 20 fixed in tube 11. Vanes 19 are elongated, substantially planar members disposed with their short axis parallel to the axis of inlet tube 11. Vanes 19 are rotatable with shaft 16 about the axis of inlet tube 11 and, as shown, are positioned immediately in advance of intermediate tubular section 13. For a purpose which will be more fully pointed out, a bevel gear 21 is mounted for rotation with shaft 16 and meshes with bevel gear 22 fixed on shaft 23 of an energy absorber indicated generally at 24. In the present embodiment, energy absorber 24 may be a synchronous electric generator or other suitable device such as a water brake with a speed control means.

As thus far described, it will be apparent that material flowing in the direction of arrow 25 through the passage formed by inlet tube 11 is first deflected by guide vanes 14 and then on passing between rotatable vanes 19 causes vanes 19 to rotate about the axis of tube 11. Vanes 19 have an axial exit angle and are shown mounted edge-on with respect to true axial flow of the stream of material in tube 11. Energy absorber 24 tends to load rotating vanes 19 to a greater or lesser extent depending upon the radial force imparted to the vanes by the flowing stream of material thereby maintaining the rate of revolution of vanes 19 constant. Consequently, the angular component of exit velocity of the material leaving vanes 19 is independent of the volumetric flow rate and the angular momentum is directly proportional to the mass flow rate.

Figure 3:
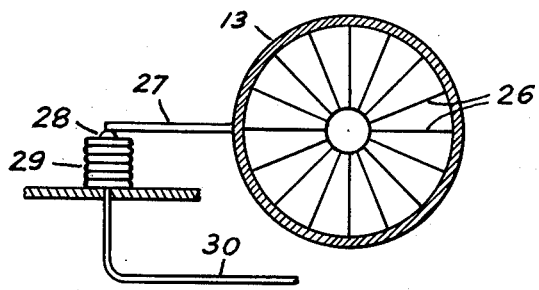
FIGURE 3 is a fragmentary sectional view along the line 3—3 of FIGURE 1.

Sensing means are provided for determining the mass of the flowing material and include measuring vanes 26 radially mounted in intermediate tubular member 13 about the axis of member 13. Measuring vanes 26 are planar members each extending parallel with the axes of the tubes in the direction of arrow 25 and are sufficiently long axially to insure that all of the angular momentum of the stream is removed. Since the angular velocity of successive portions of the stream leaving rotating vanes 19 is constant, variations in the angular momentum imparted to measuring vanes 26 by the stream are directly proportional to variations in material mass flow rate. Consequently, the torque exerted by the rotatably mounted intermediate member 13 is proportional to and serves as a measure of the mass flow rate. As shown in FIGURE 3, the measurement may be conveniently made by connecting intermediate tubular member 13 through lever 27 to the movable end 28 of a bellows 29 the other end of which is fixed. Bellows 28 may be resilient or suitable resilient means may be provided so that the bellows follows link 27. A suitable measuring instrument, not shown, is linked to bellows 29 by means of conduit 30, the interior of which communicates with the interior of the bellows. Bellows 29 and conduit 30 contain a suitable pressure fluid maintained at a predetermined static pressure while the measuring instrument responds to variations in pressure in the bellows-conduit system caused by movement of bellows end 28.

Figure 4:
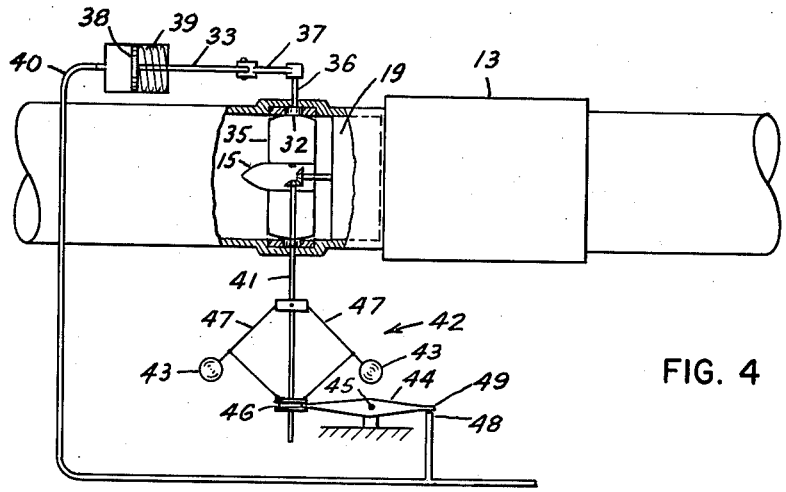
FIGURE 4 is a diagrammatic view, partly in section, of another embodiment showing an arrangement for automatic adjustment of the inlet guide vanes.
Figure 6:
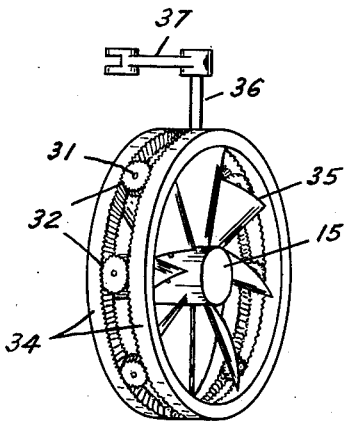
FIGURE 6 is a perspective view of the inlet guide vanes and means for adjusting their inclination.

The rotative speed of vanes 19 may be maintained constant and the fluid angular velocity thus fixed by varying the inclination of the inlet guide vanes and rotating them about their radial axis. As indicated in FIGURES 4 and 6, inlet guide vanes 35, which are otherwise similar to guide vanes 14, are mounted between hub 15 and ring gears 34 for limited rotation about their longitudinal or radially extending axes. Guide vanes 35 are each provided with stems 31, one of which is journaled into hub 15 while the other carries gear wheel 32 positioned between and meshing with ring gears 34. Relative rotation of ring gears 34 provides a change in the inclination of guide vanes 35. As shown, one of the gear wheels is mounted on shaft 36 which is in turn connected to crank 37. A piston 38 is connected to crank 37 through its stem 33. One side of piston 38 is engaged by spring 39 while the other side is exposed to a source of air under pressure through conduit 40. Rotatable vanes 19 are coupled to and serve to drive shaft 41 and thereby rotate governor 42 mounted on shaft 41. Weights 43 of governor 42 are carried more or less radially upward away from shaft 41 depending upon the speed of rotation of the shaft and rotatable vanes 19. Lever 44 is pivotally mounted at 45 and has one end in engagement with collar 46 slidably mounted on shaft 41 and connected to weight arms 47 which carry weights 43. The free end of lever 44 is juxtaposed to a nozzle 48 having an orifice which is more or less obstructed by a flapper or obturator 49 carried by lever 44. For a predetermined speed of rotation of rotatable vanes 19 lever 44 is positioned to so regulate the escape of air from nozzle 48 that the pressure in conduit 40 acting upon piston 38 maintains the angular disposition of vanes 35 such that rotatable vanes 19 continue to rotate at that speed under the influence of the material flowing through tube 11. Should the flow rate of the material vary so as to effect a change in the speed of rotation of vanes 19, shaft 41 is rotated at a greater or lesser speed as the case may be and acting through governor 42 correspondingly shifts lever 44 and flapper 49 carried thereby so as to obstruct to a greater or less extent the escape of air from nozzle 48. The resultant change in pressure in conduit 40 serves to correspondingly shift piston 38 and thereby affect the inclination of vanes 35 so as to decrease or increase the angular velocity of the material and maintain the angular speed of rotatable vanes 19 constant. This serves as a convenient arrangement for power amplification to avoid excessive loading of the rotatable vanes. Stabilizing means, well known in the art, may be utilized to prevent hunting of the governor device.

Figure 5:
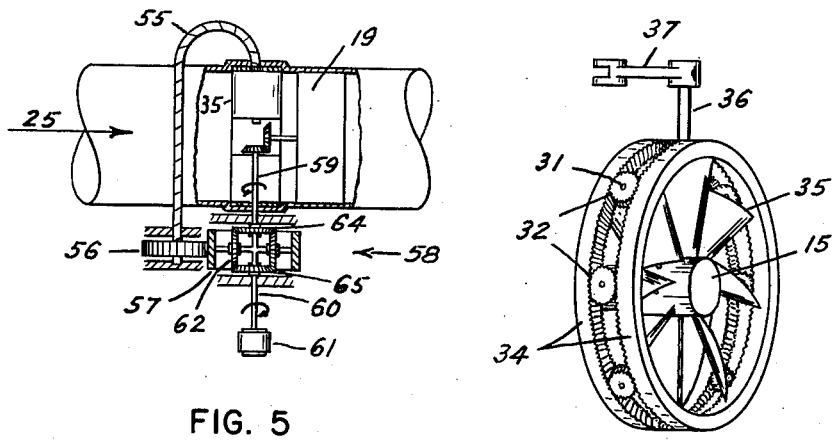
FIGURE 5 is a diagrammatic view of another arrangement for automatic adjustment of the inlet guide vanes.

In FIGURE 5 adjustable vanes 35 mounted as shown in FIGURE 6 are linked to a flexible shaft 55 connected to one of the gears 32 and are more or less inclined with respect to the direction of axial flow of the material to be measured in tube 11, indicated by arrow 25, depending upon the direction of rotation of shaft 55. Gear wheel 56 is fixed to flexible shaft 55 for rotating the same and meshes with spur wheel 57 of a differential gear unit 58. One side of differential unit 58, sun wheel 64, is connected to and rotatable with shaft 59 which is in turn connected to and driven by rotating vanes 19 in the direction indicated by the arrow. The connection to rotating vanes 19 may be effected in any suitable manner, for example, as shown in FIGURE 1. The opposite side of differential unit 58, sun wheel 65, is connected by shaft 60 to constant speed motor 61. Motor 61 is adjusted to rotate shaft 60 at a predetermined speed equal to the desired constant speed of rotation of rotatable vanes 19 as reflected in the speed of rotation of shaft 59 but in the opposite sense as indicated. Any difference in the speed of rotation between shafts 59 and 60 results in planetary rotation of bevel pinion gear 62, which rotation is imparted to gear wheel 56 through spur wheel 57. It will be apparent then that any change in the angular velocity of rotatable vanes 19 immediately results in a concomitant shift in the inclination of adjustable vanes 35 due to rotation of flexible shaft 55 thereby to cause a compensating change in the angular velocity imparted to the material flowing between vanes 35.

Figure 7:
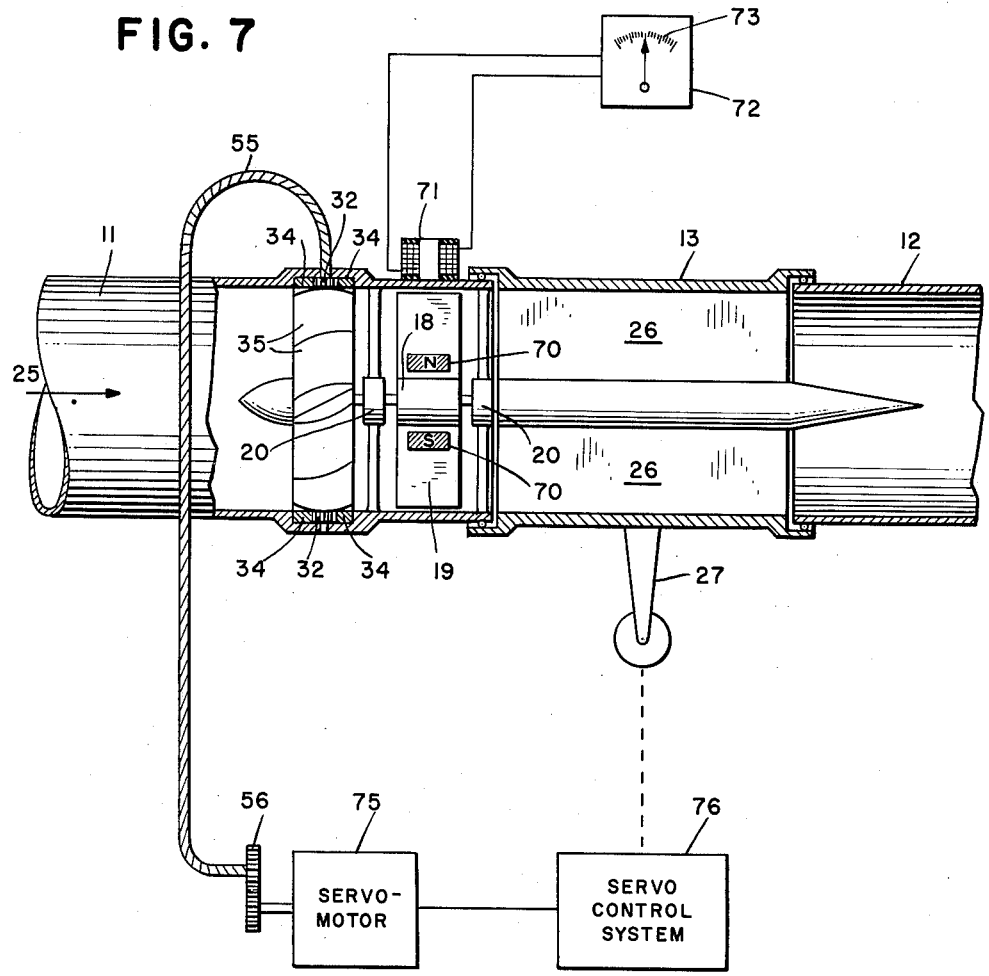
FIGURE 7 is a horizontal sectional view, partially diagrammatic of a preferred embodiment of a mass flow meter incorporating the present invention and in which the angular momentum imparted to the material is maintained constant, variations in the angular velocity of the material providing a measure of the mass rate of flow.

In the apparatus as thus far described, means are provided for maintaining constant the angular velocity imparted to the material, the mass rate of flow of which is being measured. In the embodiment shown in FIGURE 7 and now to be described, the torque exerted by vanes 26 and intermediate tubular section 13 is maintained constant by suitable feedback means linking the tubular section 13 with the inlet guide vanes 35. Thus, the mass flow meter shown in FIGURE 7 is of generally similar construction to that shown in FIGURES 1 or 4, corresponding parts having been designated by the same reference characters. Here the assembly of rotatable vanes mounted between the inlet guide vanes 35 and the torque measuring vanes 26 are left free to rotate under the influence of the material flowing from the exit opening of guide vanes 35. The speed of rotation of vanes 19 may be sensed in any convenient manner. As indicated in FIGURE 7, a permanent magnet 70, the poles of which are indicated by the letters N and S in FIGURE 7, is mounted for rotation with the assembly of vanes 19. A coil 71 mounted externally of inlet tube 11 for cooperation with magnet 70 is electrically connected to an electrical tachometer or frequency meter indicated at 72, having a suitably graduated scale 73.

In FIGURE 7, the adjustable vanes 35 are mounted as shown in FIGURE 6 and are linked to a flexible shaft 55 connected to one of the gears 32. Flexible shaft 55 is coupled through suitable reduction gears to a servomotor 75 which in turn is linked through a conventional servo control system to intermediate tubular section 13 and vanes 26.

The apparatus is initially adjusted and put into operation so that for a given mass flow rate the torque exerted by vanes 26 in removing the angular momentum from the flow is at a predetermined value. The rotational speed of the assembly of vanes 19 reflects the angular velocity imparted to the material by guide vanes 35. Rotation of magnet 70 with vanes 19 induces an alternating current to flow in coil 71. The frequency of this alternating current correseponds to the speed of rotation of vanes 19 and causes a corresponding deflection of the pointer with respect to scale 73 which may be conveniently graduated in suitable units of mass rate of flow. Assuming now that there is a change in the mass rate of flow of the material through inlet tube 11, the change in torque exerted by vanes 26 is transmitted through servo control system 76 to servomotor 75 which in turn adjusts the inclination of guide vanes 35 in a direction to restore the angular momentum of the material and thereby the torque exerted by vanes 26 to the preselected constant value. This change in the inclination of guide vanes 35 causes a change in the angular velocity of the material flowing between vanes 35 and a consequent change in the rotational speed of vanes 19. Furthermore, the change in rotational speed of vanes 19 in turn causes a change in the coupling between magnet 70 and coil 71 and a concomitant change in the reading on scale 73.

Figure 8:
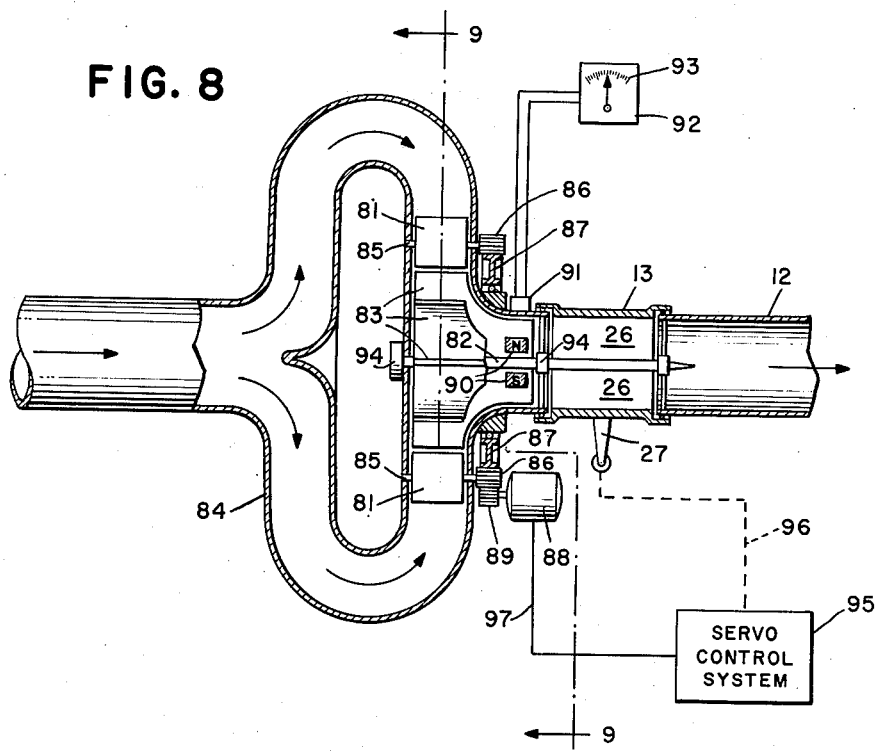
FIGURE 8 is a longitudinal cross-sectional view of a further embodiment of the present invention in which the angular momentum imparted to the material is maintained constant and variations in the angular velocity of the material are sensed to provide a measurement of the mass rate of flow.
Figure 9:
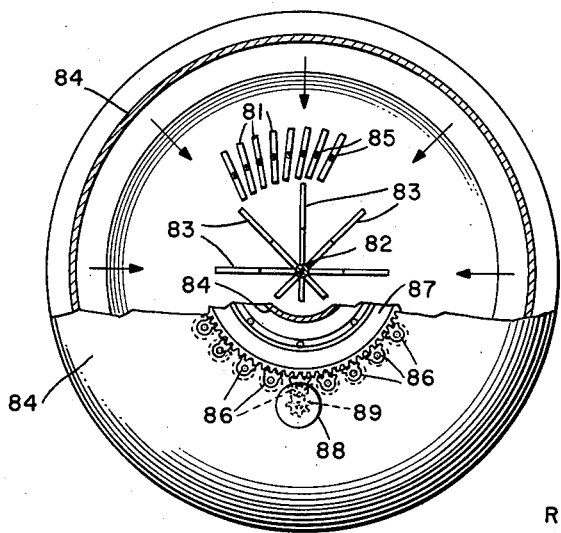
FIGURE 9 is a cross-sectional view, partially in elevation, taken through the line 9—9 of FIGURE 8.

Referring now to FIGURES 8 and 9, mass flow meter 80 is an embodiment of the present invention in which the radially directed flow, in the present instance radially inward, of the stream has imparted thereto angular momentum by adjustably mounted guide vanes 81. Guide vanes 81 are disposed in a radial array about the axis along which a rotatable shaft 82 extends and to which an assembly of vanes 83 are connected for rotation.

Guide vanes 81 correspond to guide vanes 35 and are mounted in an annular array about the radially inwardly extending portion of a torroidally shaped inlet member 84. The exit or downstream end of inlet member 84 is jointed to rotatably supported intermediate tubular section 13 containing torque sensing vanes 26 as described hereinabove in connection with inlet tube 11. Each of the guide vanes 81 is mounted on a shaft 85 which is rotatably supported in the wall of inlet member 84 and extends in a radial plane which passes through the axis of shaft 82. One end of each of the shafts 85 is rotatably sealed through the wall of inlet member 84 and has fixed thereto a pinion gear 86. Each of the pinion gears is in mesh with a ring gear 87. A servomotor 88 is connected through suitable reduction gears 89 to one of the pinion gears 86. Energization of servomotor 88 to rotate its output shaft in one direction or the other causes rotation, in a corresponding direction, of the pinion gear 86 connected thereto through reduction gears 89 and its guide vane 81. This motion is imparted through the pinion gear to ring gear 87 and in turn to the remaining pinion gears 86 and their guide vanes 81. Thus, operation of servomotor 88 causes a corresponding change in the inclination of all of the guide vanes 81 with respect to the radii extending from the axis through their respective shafts 85.

Shaft 82 is rotatably supported by means of bearings 94 and carries vanes 83. Rotatable vanes 83 are freely rotatable and correspond to vanes 19 in FIGURE 7 and have a permanent magnet 90 mounted for rotation therewith. A coil 91 is positioned externally of inlet member 84 for cooperation with magnet 90 and is connected with a suitable meter 92 having a scale 93 graduated to provide an indication of the mass rate of flow of the material flowing through meter 80.

As described in connection with FIGURE 7, link 27 of rotatable section 13 is operatively interconnected by link 96 with a conventional servo control system 95 which in turn controls the operation of servomotor 88 as indicated by link 97.

In operation, material flowing in inlet member 84 is first directed radially outward and then radially inward. While flowing radially, the portion of the annular stream impinging on guide vanes 81 is given thereby an angular momentum about the axis of the torroidally shaped inlet member 84. The initial adjustment is such that a desired predetermined torque is developed by vanes 26 in removing the angular momentum from the flow. The resulting rotational speed of vanes 19 is sensed by coil 91 and registers on scale 93 of meter 92 as a measure of the mass rate of flow. Assuming now that the mass rate of flow of the material flowing through inlet member 84 increases, this is reflected in an increase in the torque exerted by vanes 26 in removing the angular momentum from the flow. In response to this increased torque servomotor 88 is energized by the servo control system 95 to rotate the guide vanes 81 in the direction to reduce the angular momentum and hence the angular velocity imparted to the flow. The reduction in angular velocity results in a corresponding reduction of the rotational speed of freely rotatable vanes 83. As has already been indicated hereinabove the mass rate of flow is inversely proportional to the angular velocity, angular momentum being maintained constant, and this is reflected in the swing up-scale of the pointer along scale 93 to provide the corresponding indication of the increase in the mass rate of flow of the material.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. A mass flow meter for measuring the mass flow rate of material flowing in a stream, comprising an inlet tube defining an elongated passage along which said stream normally flows axially in a given direction, a plurality of radially extending guide vanes mounted in said inlet tube and spaced about the axis thereof, means fixing said guide vanes against rotation about the axis of said inlet tube, said guide vanes being disposed with the axes thereof normal to their radial axes extending in planes inclined with respect to the axis of said inlet tube, the inclination of said guide vanes forming substantially the sole obstruction to axial flow of said stream, whereby the material flowing between said guide vanes has a portion of its energy converted into an angular velocity about the axis of said inlet tube while the remaining energy of said material is substantially undisturbed, a plurality of radially extending rotatable vanes mounted for rotation and spaced about the axis of said inlet tube downstream from said guide vanes, each of said rotatable vanes having an axial exit angle, means for limiting said rotatable vanes to a predetermined angular velocity, and measuring means downstream from said rotatable vanes responsive to angular momentum of the material in said stream about the axis of said inlet tube, for providing a representation of the mass flow rate of said material in accordance with the relation $$M = \frac{T}{V}$$

where M is the mass flow rate of the material, T is the angular momentum of the material about said axis and V is the angular velocity of said material.

2. A mass flow meter as set forth in claim 1 wherein said limiting means includes a synchronous electric generator coupled to said rotatable vanes.

3. A mass flow meter for measuring the mass flow rate of material flowing in a stream, comprising an inlet tube defining an elongated passage along which said stream normally flows axially in a given direction, a plurality of radially extending guide vanes mounted in said inlet tube and spaced about the axis thereof, means fixing said guide vanes against rotation about the axis of said inlet tube, said guide vanes being disposed for limited displacement in an angular sense about their radially extending axes and normally extending in planes inclined at a predetermined angle with respect to the axis of said inlet tube, a plurality of radially extending rotatable vanes mounted for rotation and spaced about the axis of said inlet tube downstream from said guide vanes, each of said rotatable vanes having an axis thereof extending in a plane normal to its plane of rotation with each vane lying in an axial plane, means responsive to variations in the angular velocity of said rotatable vanes from a predetermined velocity and coupled to said guide vanes for automatically adjusting the inclination thereof whereby the material flowing between said guide vanes has only that portion of its energy converted into angular velocity about the axis of said inlet tube necessary to maintain said predetermined angular velocity of said rotatable vanes, and measuring means downstream from said rotatable vanes responsive to angular momentum of the material in said stream about the axis of said inlet tube, for providing a representation of the mass flow rate of said material in accordance with the relation $$M = \frac{T}{V}$$

where M is the mass flow rate of the material, T is the angular momentum of the material about said axis and V is the angular velocity of said material.

4. A mass flow meter as set forth in claim 3 wherein said means responsive to variations in the angular velocity of said rotatable vanes comprises linkage means and power amplifying means connected thereby to said guide vanes.

5. A mass flow meter as set forth in claim 3 wherein said means responsive to variations in the angular velocity of said rotatable vanes comprises mechanical differential means having one side thereof connected to and driven by said rotatable vanes in a given sense and its opposite side connected to and driven by a constant speed device in the opposite sense whereby the speed of rotation of said rotatable vanes is compared to said constant speed device to produce an ouput equal to the algebraic sum thereof, and means coupling the output of said differential means to said guide vanes for automatically adjusting the same and thereby the angular velocity of said rotatable vanes.

6. A mass flow meter for measuring the mass flow rate of material flowing in a stream, comprising an inlet tube defining an elongated passage along which said stream normally flows axially in a given direction, a plurality of radially extending guide vanes adjustably mounted in said inlet tube and spaced about the axis thereof, means fixing said guide vanes against rotation about the axis of said inlet tube, said guide vanes being disposed with the axes thereof normal to their radial axes extending in planes inclined with respect to the axis of said inlet tube, the inclination of said guide vanes forming substantially the sole obstruction to axial flow of said stream, whereby the material flowing between said guide vanes has a portion of its energy converted into an angular velocity about the axis of said inlet tube while the remaining energy of said material is substantially undisturbed, a plurality of radially extending rotatable vanes mounted for rotation and spaced about the axis of said inlet tube downstream from said guide vanes, means for measuring the speed of rotation of said rotatable vanes, and means downstream from said rotatable vanes responsive to angular momentum of the material in said stream about the axis of said inlet tube and coupled with said guide vanes for maintaining the angular momentum of the material flowing from said rotatable vanes at a predetermined value.

7. A mass flow meter for measuring the mass flow rate of material flowing in a stream, comprising an inlet tube defining an elongated passage along which said stream normally flows axially in a given direction, a plurality of radially extending guide vanes mounted in said inlet tube and spaced about the axis thereof, means fixing said guide vanes against rotation about the axis of said inlet tube, said guide vanes being disposed for limited displacement in an angular sense about their radially extending axes, a plurality of radially extending rotatable vanes mounted for rotation and spaced about the axis of said inlet tube downstream from said guide vanes, means for measuring the angular velocity of said rotatable vanes, and means downstream from said rotatable vanes responsive to angular momentum of the material in said stream about the axis of said inlet tube and coupled to said guide vanes for automatically adjusting the inclination thereof and thereby maintain the angular momentum of the material exiting from said rotatable vanes at a predetermined value.

8. A mass flow meter for measuring the mass flow rate of material flowing in a stream, comprising an inlet tube defining an elongated passage along which said stream normally flows axially in a given direction, a plurality of radially extending guide vanes mounted in said inlet tube and spaced about the axis thereof, means fixing said guide vanes against rotation about said axis, said guide vanes each being disposed for limited displacement in an angular sense about their radially extending axes, a plurality of radially extending rotatable vanes mounted for rotation and spaced about the axis of said inlet tube downstream from said guide vanes, means for measuring the angular velocity of said rotatable vanes, torque sensing means downstream from said rotatable vanes responsive to angular momentum of the material in said stream, and feed-back means coupled to said torque sensing means and to said guide vanes for adjusting the inclination of the latter in a direction for maintaining constant the angular momentum of the material in said stream exiting from said rotatable vanes.

9. A mass flow meter for measuring the mass flow rate of material flowing in a stream, comprising an inlet tube defining a passage along which said stream flows radially about an axis, a plurality of radially extending guide vanes mounted in said passage and spaced about said axis, means fixing said guide vanes against rotation about said axis, said guide vanes each being disposed for limited displacement in an angular sense about an axis thereof normal to the radially extending axis thereof, a plurality of radially extending rotatable vanes mounted for rotation and spaced about the axis of said inlet tube downstream from said guide vanes, each of said rotatable vanes having an axis thereof extending in a plane normal to its plane of rotation with each vane lying in an axial plane, means for measuring the angular velocity of said rotatable vanes, and means downstream from said rotatable vanes responsive to angular momentum of the material in said stream coupled to said guide vanes for automatically adjusting the inclination thereof and thereby maintain the angular momentum of the material exiting from said rotatable vanes at a predetermined value.

10. A mass flow meter for measuring the mass flow rate of material flowing in a stream, comprising an inlet tube defining a passage along which said stream flows radially about an axis, a plurality of radially extending guide vanes mounted in said passage and spaced about said axis, means fixing said guide vanes against rotation about said axis, said guide vanes each being disposed for limited displacement in an angular sense about an axis thereof normal to the radially extending axis thereof, a plurality of radially extending rotatable vanes mounted for rotation and spaced about the axis of said inlet tube downstream from said guide vanes, each of said rotatable vanes having an axis thereof extending in a plane normal to its plane of rotation with each vane lying in an axial plane, means for measuring the angular velocity of said rotatable vanes, torque sensing means downstream from said rotatable vanes responsive to angular momentum of the material in said stream, and feed-back means coupled to said torque sensing means and to said guide vanes for adjusting the inclination of the latter in a direction for maintaining constant the angular momentum of the material in said stream exiting from said rotatable vanes.

11. A mass flow meter for measuring the mass rate of flow of a material flowing in a flow circuit, comprising first means for converting a portion of the fluid energy of the material to angular velocity about an axis while leaving the remaining fluid energy of said material substantially undisturbed, said first means including a plurality of guide members arranged about said axis and fixed against rotation about said axis, second means downstream from said first means for providing a representation of the angular momentum of said material about said axis, means for providing an indication of the angular velocity of said material about said axis immediately in advance of said second means, and means including said angular velocity indicating means for providing a representation of the mass flow rate of said material in accordance with the relation $$M = \frac{T}{V}$$

where M is the mass flow rate of the material, T is the angular momentum of the material about said axis and V is the angular velocity of said material.

12. A mass flow meter for measuring the mass rate of flow of a material flowing in a flow circuit, comprising first means for converting a portion of the fluid energy of the material to angular velocity about an axis while leaving the remaining fluid energy of said material substantially undisturbed, said first means including a plurality of guide members arranged about said axis and fixed against rotation about said axis, second means downstream from said first means for providing a representation of the angular momentum of said material about said axis, means for reacting to the angular velocity of said material about said axis immediately in advance of said second means, and means including said angular velocity reactive means for providing a representation of the mass flow rate of said material in accordance with the relation $$M = \frac{T}{V}$$

where M is the mass flow are of the material, T is the angular momentum of the material about said axis and V is the angular velocity of said material.

13. A mass flow meter for measuring the mass rate of flow of a material flowing in a flow circuit, comprising means for confining the entire flow of the material to be measured to a linear path, first means for converting a portion of the fluid energy of the material in said path to angular velocity about an axis while leaving the remaining fluid energy of said material substantially undisturbed, said first means including a plurality of guide members arranged about said axis and fixed against rotation about said axis, second means downstream from said first means for providing a representation of the angular momentum of said material about said axis, means for reacting to the angular velocity of said material about said axis immediately in advance of said second means, and means including said angular velocity reactive means for providing a representation of the mass flow rate of said material in accordance with the relation $$M = \frac{T}{V}$$

where M is the mass flow rate of the material, T is the angular momentum of the material about said axis and V is the angular velocity of said material.

14. A mass flow meter as set forth in claim 13 wherein said angular velocity reactive means includes means for limiting said angular velocity to a predetermined speed of revolution.

15. A mass flow meter for measuring the mass rate of flow of a material flowing in a flow circuit, comprising means for confining the entire flow of the material to be measured to radial paths about a common axis, first means for converting a portion of the fluid energy of the material in said path to angular velocity about an axis while leaving the remaining fluid energy of said material substantially undisturbed, said first means including a plurality of guide members arranged about said axis and fixed against rotation about said axis, second means downstream from said first means for providing a representation of the angular momentum of said material about said axis, means for reacting to the angular velocity of said material about said axis immediately in advance of said second means, and means including said angular velocity reactive means for providing a representation of the mass flow rate of said material in accordance with the relation $$M = \frac{T}{V}$$

where M is the mass flow rate of the material, T is the angular momentum of the material about said axis and V is the angular velocity of said material.

References Cited in the file of this patent

UNITED STATES PATENTS

| | | |
|---|---|---|
| 2,709,755 | Potter | May 31, 1955 |
| 2,714,310 | Jennings | Aug. 2, 1955 |
| 2,832,218 | White | Apr. 29, 1958 |
| 2,857,761 | Bodge | Oct. 28, 1958 |
| 2,882,727 | Newbold | Apr. 21, 1959 |
| 2,896,084 | MacDonald | July 21, 1959 |
| 2,907,208 | Taylor | Oct. 6, 1959 |
| 2,941,402 | Scanes | June 21, 1960 |
| 2,975,634 | Rose | Mar. 21, 1961 |

FOREIGN PATENTS

| | | |
|---|---|---|
| 744,852 | Great Britain | Feb. 16, 1956 |